(No Model.)
W. A. JOHNSON.
SQUEEZER AND STRAINER.
No. 344,446. Patented June 29, 1886.
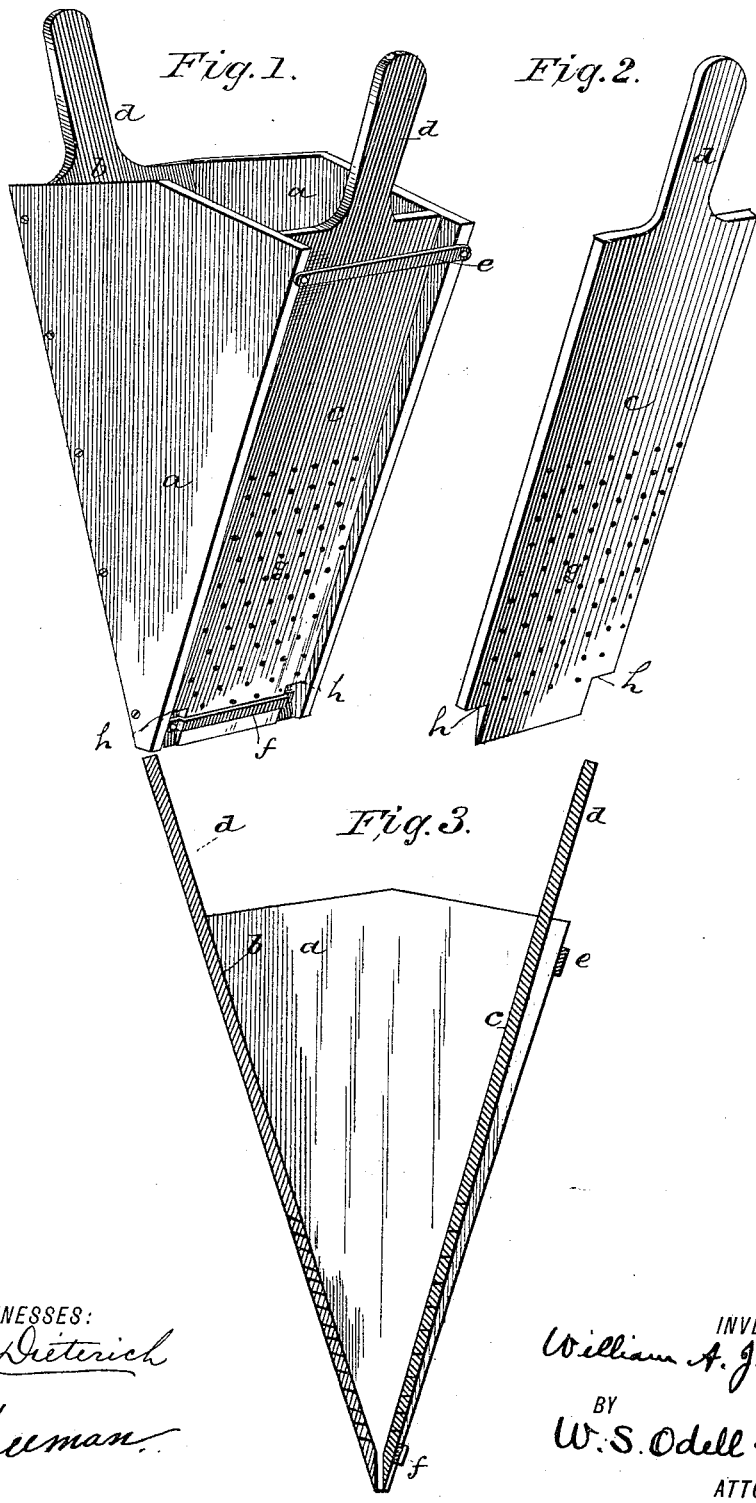
WITNESSES:
Fred G. Dieterich
C. L. Furman
INVENTOR
William A. Johnson
BY
W. S. Odell & Co.
ATTORNEYS
N. PETERS, Photo-Lithographer, Washington, D. C.

United States Patent Office.

WILLIAM A. JOHNSON, OF JADDEN, INDIANA.

SQUEEZER AND STRAINER.

SPECIFICATION forming part of Letters Patent No. 344,446, dated June 29, 1886.

Application filed February 19, 1886. Serial No. 192,521. (No model.)

*To all whom it may concern:*

Be it known that I, WILLIAM A. JOHNSON, a citizen of the United States, residing at Jadden, in the county of Grant and State of Indiana, have invented certain new and useful Improvements in Squeezers and Strainers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The chief object of this invention is to afford a durable, cheap, portable, and adjustable hand implement for household use in expressing lard and oils from the flesh and fatty structure of animals.

It consists of certain new devices and combinations, which are fully explained as follows:

In the accompanying drawings, Figure 1 is a vertical and perspective view of the press with the lever-lid in position for use. Fig. 2 is a view of the lever-lid detached. Fig. 3 is a vertical section of the press.

In Fig. 1, $a\ a$ are the triangular sides fastened with screws to the bottom $b$. The sides $a\ a$ are each about twenty inches long, about eight inches wide at the upper end, and one and one-half inch wide at the lower end. The bottom $b$ is about thirty inches long, including the handle $d$, which is about ten inches long, and is about eight inches wide. The two triangular sides $a\ a$ are fastened at their upper front edges and held in place by the iron stay-bar $e$, which prevents the spreading of the sides $a\ a$ when the press is used, and serves also as a support to the lever-lid $d\ c\ g$ while the operator is filling the press. The iron hasp $f$ receives and holds the lower end of the lever-lid $d\ c\ g$, and serves as a fulcrum in the process of operating the press.

In Fig. 2, $d\ c\ g$ is the lever-lid detached.

The handle $d$, plane $c$, and strainer-holes $g$ are a counterpart of the bottom $b$ both as to dimensions and construction. It serves as a combined lever, lid, and strainer in operating the press. It is adjustable, allowing its detachment for the purpose of emptying the contents of and cleaning the parts of the press.

Both the bottom $b$ and lever-lid are perforated with small holes $g$, from their lower ends to about half-way to the upper end of the box to strain off the expressed lard or oils. All the sides are made of strong hard wood about seven-eighths of an inch thick, dressed on both sides. The inner or lower edges of lever-lid $c$ are cut inward to form shoulders $h$, that rest on or abut against the upper edge of hasp $f$, thereby holding said lever-lid in place when in use, forming a hinge and preventing said lid from being pushed longitudinally by the operator.

I am aware of the Patent No. 337,185, March 2, 1886, and I therefore do not claim the same nor the parts of its various construction.

I claim—

In a lard-press, the solid triangular-shaped sides secured to the edges of a perforated bottom, provided with an outer handle and an inner wedge-shaped end, and a separate removable perforated top provided with an outer handle and a shouldered and wedge-shaped inner end, in combination with a base lever-band or hasp and a top stay bar or keeper, all arranged and operated substantially as shown and specified.

In testimony whereof I have affixed my signature in presence of two witnesses.

WILLIAM A. JOHNSON.

Witnesses:
 WILSON ADDINGTON,
 CHAS. A. LILLIBRIDGE.